J. D. NIEDERLITZ.
TRAP.
APPLICATION FILED AUG. 24, 1911.
1,024,278.
Patented Apr. 23, 1912.
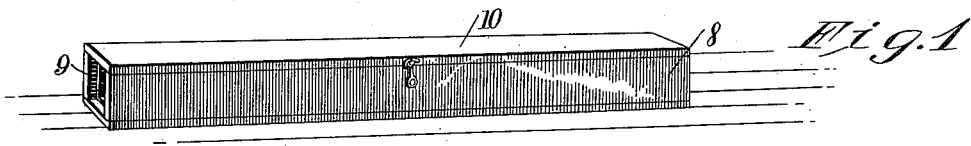
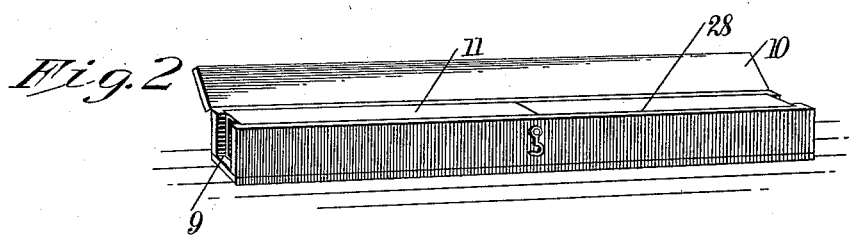
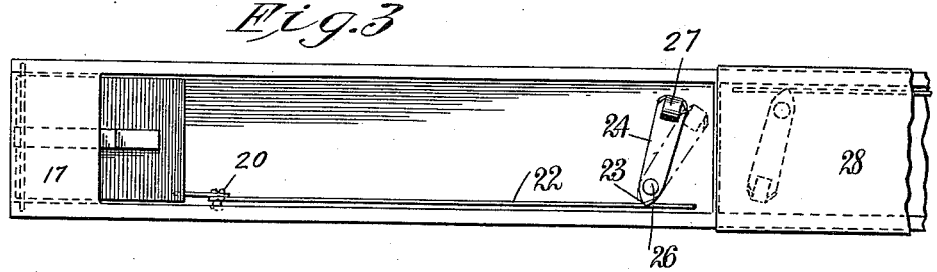
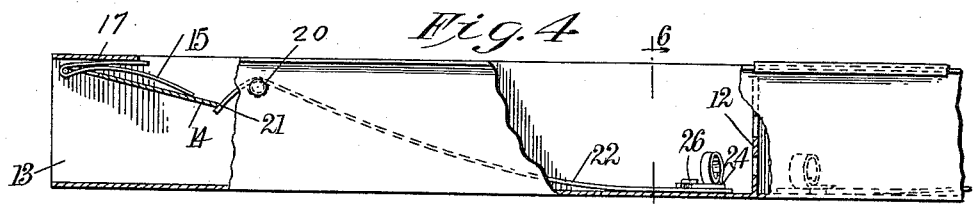
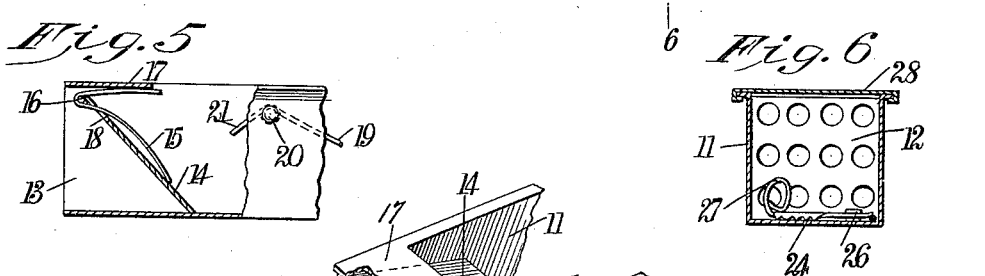
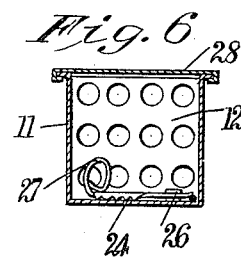
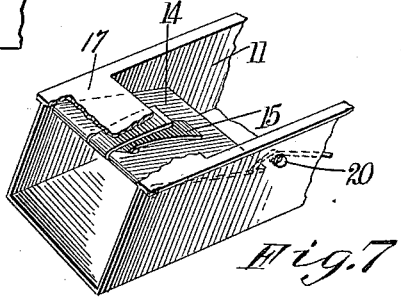
WITNESSES
F. E. Alexander
W. S. Orton.
INVENTOR
Joseph D. Niederlitz
BY Munn & Co.
ATTORNEYS
COLUMBIA PLANOGRAPH CO., WASHINGTON, D. C.

UNITED STATES PATENT OFFICE.

JOSEPH D. NIEDERLITZ, OF JERSEY CITY, NEW JERSEY.

TRAP.

1,024,278. Specification of Letters Patent. Patented Apr. 23, 1912.

Application filed August 24, 1911. Serial No. 645,702.

*To all whom it may concern:*

Be it known that I, JOSEPH D. NIEDERLITZ, a citizen of the United States, and a resident of Jersey City, in the county of Hudson and State of New Jersey, have invented a new and Improved Trap, of which the following is a full, clear, and exact description.

My invention relates to a new and improved form of rat trap particularly adapted for rat runways, and an object of my invention is to provide a novel form of trap designed to deceive the rat, and one in which the trapped rats are invisible.

A further object of my invention is to provide a trap so constructed that the scent of the bait will be carried to the prowling rodents.

With the above and other objects in view as will more fully hereinafter appear, the present invention consists in certain novel details of construction and arrangement of parts hereinafter fully described, illustrated in the accompanying drawings and more particularly pointed out in the appended claim.

Reference is to be had to the accompanying drawings, forming a part of this specification, in which similar characters of reference indicate corresponding parts in all the views, and in which—

Figure 1 is a perspective view of the outside of a preferred embodiment of my invention; Fig. 2 is a similar view with the lid raised; Fig. 3 is a plan view of the metallic trap removed from the casing and with one of the covers removed; Fig. 4 is a side elevation of the same, parts of the sides broken away to show the internal mechanism; Fig. 5 is a detail side elevation of one of the hinged doors; Fig. 6 is a transverse sectional view taken on the line 6—6 of Fig. 4 and looking in the direction of the arrow; and Fig. 7 is a perspective view of one end of the trap.

Described more in detail, I have shown an elongated wooden casing 8 having open ends 9 and a hinged cover 10. Disposed within the casing 8 is a metallic trap 11, which trap terminates a short distance within the openings 9, is preferably made of some suitable metal, and has securely positioned therein, a perforated partition 12 dividing the trap into two compartments. Each of the openings 13, at the opposite ends of the trap 11, is closed by means of a hinged door 14, which door is preferably hinged to the opposite sides of the trap adjacent the upper edge thereof. The door is normally maintained in closed position by means of a V-shaped leaf spring 15, which leaf spring is bent about the pivotal point 16 of the door, and has one end pressing against a top plate 17 bridging the top of the trap, the opposite end of which spring passes through an opening 18 in the door 14 and has its free end bearing upon the inside of the door as shown more particularly in Fig. 5. In order to hold the door in open position, a wire lever 19 is pivoted to a stud 20 on the inside of the trap. The short end 21 of this lever is adapted to be positioned beneath the door 14, to hold the same in the raised position shown in Fig. 4. The opposite long arm 22 is adapted to be inserted beneath the nose 23 of a bait-carrying lever 24 pivoted by means of a pin 26 to the bottom of the trap 11. The end of the lever 24 is bent upwardly into a circular eye 27 adapted to carry the bait.

It will be seen by the above outlined construction that the rat entering either opening 13 and nibbling on the bait, will disengage the nose 23 from the arm 22, thereby permitting said arm to fly upward and permitting the spring 15 to force the door 14 into closed position, thereby imprisoning the rodent. Similarly, a rodent may be caught in the opposite compartment.

The metallic trap is closed by means of a pair of sliding top plates 28, said plates being in closed position when the trap is set. This trap is adapted to be positioned in the rat's runway, and the circulation of air through the open opposite ends permits the odor of the bait to be carried along said runway.

Having thus described my invention, I claim as new and desire to secure by Letters Patent:

A trap, comprising an elongated open-ended body, a central partition dividing said trap into two compartments, a hinged door at each of said open ends for normally closing the same, springs maintaining said doors in closed position, a wire lever pivoted to the side of said casing in each compartment, one short end of said lever adapted to engage each door, a bait-holding lever in each compartment adjacent said partition, and a nose on said lever adapted to engage the long arm of said wire lever, to maintain said door in open position.

In testimony whereof I have signed my name to this specification in the presence of two subscribing witnesses.

JOSEPH D. NIEDERLITZ.

Witnesses:
RUDOLPH C. E. MAY,
ALICE V. QUINLAN.

Copies of this patent may be obtained for five cents each, by addressing the "Commissioner of Patents, Washington, D. C."